US012369101B2

(12) United States Patent
Han et al.

(10) Patent No.: US 12,369,101 B2
(45) Date of Patent: Jul. 22, 2025

(54) MULTI-ACCESS POINT ASSISTANCE TRANSMISSION METHOD AND DEVICE, STORAGE MEDIUM AND ELECTRONIC DEVICE

(71) Applicant: ZTE CORPORATION, Shenzhen (CN)

(72) Inventors: Zhiqiang Han, Shenzhen (CN); Bo Sun, Shenzhen (CN); Nan Li, Shenzhen (CN); Dan Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 382 days.

(21) Appl. No.: 17/624,527

(22) PCT Filed: Apr. 30, 2020

(86) PCT No.: PCT/CN2020/088262
§ 371 (c)(1),
(2) Date: Jan. 3, 2022

(87) PCT Pub. No.: WO2021/000646
PCT Pub. Date: Jan. 7, 2021

(65) Prior Publication Data
US 2022/0256441 A1   Aug. 11, 2022

(30) Foreign Application Priority Data
Jul. 1, 2019   (CN) .................. 201910586725.6

(51) Int. Cl.
*H04W 48/08* (2009.01)
*H04W 48/16* (2009.01)
*H04W 84/12* (2009.01)

(52) U.S. Cl.
CPC .......... *H04W 48/08* (2013.01); *H04W 48/16* (2013.01); *H04W 84/12* (2013.01)

(58) Field of Classification Search
CPC ..... H04W 48/08; H04W 48/16; H04W 84/12; H04W 40/22; H04W 88/08; H04W 24/02;
(Continued)

(56) References Cited

U.S. PATENT DOCUMENTS 8,897,261 B2 * 11/2014 Liu .................. H04W 12/06
370/328
2010/0315954 A1   12/2010 Singh et al.
(Continued)

FOREIGN PATENT DOCUMENTS

CN   101146045 A   3/2008
CN   104144475 A   11/2014
(Continued)

OTHER PUBLICATIONS

Supplemental Search Report in Chinese Application No. 2019105867256, dated Jun. 25, 2023, 8 pages, including translation.
(Continued)

*Primary Examiner* — John D Blanton
(74) *Attorney, Agent, or Firm* — Morgan, Lewis & Bockius LLP

(57) ABSTRACT

Provided are an auxiliary transmission method for multiple access points and apparatus, a storage medium and an electronic apparatus. The method includes: receiving, by a second access point, data belonging to a first station from a first access point, where the second access point and the first access point belong to the same multiple access point set; and sending, by the second access point, the data belonging to the first station associated with the first access point to the first station.

18 Claims, 5 Drawing Sheets

(58) Field of Classification Search
CPC ..... H04W 92/20; H04W 76/15; H04W 28/02; H04W 12/03; H04L 47/34; H04L 45/74; H04B 7/024
See application file for complete search history.

(56) References Cited

U.S. PATENT DOCUMENTS

| | | | |
|---|---|---|---|
| 2011/0038329 A1* | 2/2011 | Luo | H04L 5/0032 370/329 |
| 2014/0086132 A1* | 3/2014 | Liu | H04W 36/026 370/312 |
| 2015/0023245 A1 | 1/2015 | Du et al. | |
| 2015/0230167 A1 | 8/2015 | Choi | |
| 2016/0143018 A1 | 5/2016 | You et al. | |
| 2017/0105143 A1 | 4/2017 | Seok | |
| 2018/0184285 A1 | 6/2018 | Patil et al. | |
| 2019/0132762 A1 | 5/2019 | Zhu et al. | |
| 2019/0174357 A1* | 6/2019 | Lee | H04L 1/0025 |
| 2020/0037275 A1* | 1/2020 | Liu | H04L 5/0048 |
| 2021/0195632 A1* | 6/2021 | Jungnickel | H04B 10/1149 |
| 2021/0307099 A1* | 9/2021 | Ryu | H04W 76/15 |
| 2021/0385779 A1* | 12/2021 | Oteri | H04B 7/024 |
| 2022/0173773 A1* | 6/2022 | Lou | H04W 48/12 |
| 2022/0209825 A1* | 6/2022 | Chitrakar | H04W 76/15 |
| 2022/0256441 A1* | 8/2022 | Han | H04W 76/15 |

FOREIGN PATENT DOCUMENTS

| | | | | |
|---|---|---|---|---|
| CN | 105706500 | A | 6/2016 | |
| CN | 107040356 | A | 8/2017 | |
| CN | 109413672 | A | 3/2019 | |
| CN | 109672512 | A | 4/2019 | |
| EP | 3043486 | A1 * | 7/2016 | ............ H04B 7/024 |
| KR | 20130081621 | A | 7/2013 | |
| KR | 20130107798 | A | 10/2013 | |
| KR | 20150016096 | A | 2/2015 | |
| KR | 20190066165 | A | 6/2019 | |

OTHER PUBLICATIONS

Second Office Action in Chinese Application No. 2019105867256, dated Jun. 27, 2023, 14 pages, including translation.
Office Action in Indian Application No. 202227005076, dated Jun. 20, 2022, 6 pages.
Extended Search Report in European Application No. 208345728, dated May 24, 2023, 8 pages.
Indian Office Action for Application No. 202227005076, dated Jun. 20, 2022, 6 pages including English translation.
Chinese Office Action for Application No. 201910586725.6, dated Nov. 18, 2022, 8 pages including English translation.
Chinese Search Report for Application No. 201910586725.6, dated Nov. 10, 2022, 4 pages including English translation.
International Search Report for Application No. PCT/CN2020/088262, dated Jul. 29, 2020, 4 pages including English translation.
Chinese Office Action for Application No. 202227005076, dated Jun. 20, 2022, 6 pages including English translation.
Office Action in Korean Application No. 10-2022-7001364, dated Jun. 27, 2024, 11 pages, including translation.

* cited by examiner

MULTI-ACCESS POINT ASSISTANCE TRANSMISSION METHOD AND DEVICE, STORAGE MEDIUM AND ELECTRONIC DEVICE

CROSS-REFERENCE TO RELATED APPLICATIONS

This is a National Stage Application filed under 35 U.S.C. 371 based on International Patent Application No. PCT/CN2020/088262, filed on Apr. 30, 2020, which claims priority to Chinese Patent Application No. 201910586725.6 filed on Jul. 1, 2019, disclosures of both of which are incorporated herein by reference in their entireties.

TECHNICAL FIELD

The present application relates to the field of communications, for example, an auxiliary transmission method for multiple access points and apparatus, a storage medium and an electronic apparatus.

BACKGROUND

In a wireless local area network, an access point (AP) and multiple non-AP stations (STA) associated with the AP constitute a basic service set (BSS). After a station and an AP complete the operations such as association and key negotiation, the station and the AP perform data transmission.

The station can only be associated with one AP at a time, as shown in FIG. 1. The AP1 and the STA constitute a basic service set and communicate with each other. When STA wants to transmit data with AP2, STA needs to disconnect from AP1 and then establish a connection with AP2.

With the explosive growth of wireless local area network (WLAN), the network load is also increasing, the deployment of WLAN network is becoming increasingly intensive, and the overlapping of network coverage is becoming more and more serious. The efficiency of the WLAN network shows a significant downtrend, which cannot be solved by simply relying on the increase of the air interface rate. Therefore, the Institute of Electrical and Electronics Engineers (IEEE) Standards Organization has set up a next-generation task force to improve WLAN network efficiency. The technology of joint transmission for multiple access points has become a hot topic discussed.

There are two modes for multiple access point sets to jointly schedule transmission: the coordinated mode and the joint mode. The coordinated mode focuses on the technology in which user data is sent from a single AP while the joint mode focuses on the technology in which user data is sent from multiple access point sets.

Mainstream joint transmission schemes for multiple access points focus on the transmission through the joint scheduling of multiple access point sets. However, such a scheme has great complexity. For example, multiple access point sets are required to be synchronized, to perform transmission to one station at the same time, and to be subjected to beamforming training.

SUMMARY

Embodiments of the present disclosure provide an auxiliary transmission method for multiple access points and apparatus, a storage medium and an electronic apparatus, to at least solve the problem in the related art that the joint scheduling for transmission cannot be implemented until multiple access points conduct complex cooperation, thereby reducing the transmission delay of downlink data and improving the network throughput.

An embodiment of the present disclosure provides an auxiliary transmission method for multiple access points which includes the steps described below. A second access point receives data belonging to a first station from a first access point, where the second access point and the first access point belong to the same multiple access point set; and the second access point sends the data belonging to the first station to the first station.

In an embodiment, before the second access point receives the data belonging to the first station from the first access point, the method further includes the following step: multiple access point sets constitute a multiple access point set, where the multiple access point sets include the first access point and the second access point.

In an embodiment, after multiple access point sets constitute the multiple access point set, the method further includes the following step: each access point in the multiple access point set notifies multiple access point set information in a radio frame sent by the each access point in the multiple access point set.

In an embodiment, before the second access point receives the data belonging to the first station from the first access point, the method further includes the following step: the first access point is associated with the first station.

In an embodiment, in a case where the first access point is associated with the first station, the first station indicates capability of auxiliary transmission for multiple access points supported by the first station in a radio frame sent to the first access point.

In an embodiment, before the second access point receives the data belonging to the first station from the first access point, the method further includes the following step: the first access point determines to let the second access point to perform auxiliary transmission of the data belonging to the first station according to a link quality between the first station and the second access point.

In an embodiment, before the second access point receives the data belonging to the first station from the first access point, the method further includes the following step: the first access point sends the data belonging to the first station to the second access point, where the data belonging to the first station is encrypted according to a key negotiated between the first access point and the first station.

In an embodiment, when the first access point sends the data belonging to the first station to the second access point, the data carries a sequence number corresponding to the data and/or a coordinated mode of the data.

In an embodiment, a transmitter address and a receiver address are carried by the second access point in a data frame for sending the data belonging to the first station, where the transmitter address is set as an identifier of the second access point, and the receiver address is set as an identifier of the first station.

In an embodiment, an identifier of the first access point is carried in the data frame for sending the data belonging to the first station.

In an embodiment, the first station identifies the data frame as a data frame sent to the first station according to the receiver address in the data frame as the identifier of the first station and the transmitter address in the data frame as an identifier of an access point in the multiple access point set; and the first station decrypts a load of the data frame according to key information negotiated with the first access point.

In an embodiment, after the first station receives the data frame, the method further includes the following step: the first station sends an acknowledgement frame to the second access point according to the receiving of the data frame, where a receiver address in the acknowledgement frame is set as the identifier of the second access point.

In an embodiment, the acknowledgement frame is an acknowledgement (Ack) frame or a block Ack frame, where in the Ack frame, the receiver address is set as the identifier of the second access point, and in the block Ack frame, the receiver address is set as the identifier of the second access point and a transmitter address is set as the identifier of the first station.

In an embodiment, after the second access point receives the acknowledgement frame sent by the first station, the second access point reports a transmission state of the data of the station to the first access point.

Another embodiment of the present disclosure provides an auxiliary transmission apparatus for multiple access points. The apparatus is located in a second access point and includes a receiver and a sender. The receiver is configured to receive data belonging to a first station from a first access point, where the second access point and the first access point belong to the same multiple access point set. The sender is configured to send the data belonging to the first station to the first station.

In an embodiment, multiple access point sets constitute a multiple access point set, and the multiple access point sets include the first access point and the second access point.

In an embodiment, the data belonging to the first station and received by the receiver is encrypted according to a key negotiated between the first access point and the first station.

In an embodiment, the data belonging to the first station and received by the receiver carries a sequence number corresponding to the data and/or a coordinated mode of the data In an embodiment, a data frame of the data belonging to the first station and sent by the sender carries a transmitter address and a receiver address, where the transmitter address is set as an identifier of the second access point, and the receiver address is set as an identifier of the first station.

In an embodiment, an identifier of the first access point is further carried in the data frame.

In an embodiment, the receiver is further configured to receive an acknowledgement frame sent by the first station according to the receiving of the data frame to the second access point, where a receiver address in the acknowledgement frame is set as the identifier of the second access point.

In an embodiment, the acknowledgement frame is an Ack frame or a block Ack frame, where in the Ack frame, the receiver address is set as the identifier of the second access point, and in the block Ack frame, the receiver address is set as the identifier of the second access point and a transmitter address is set as the identifier of the first station.

In an embodiment, the sending module sender is further configured to report, after the acknowledgement frame sent by the first station is received, a transmission state of the data of the station to the first access point.

Another embodiment of the present disclosure further provides a storage medium. The storage medium is configured to store a computer program, where the computer program is configured to, when executed, perform the method embodiments described above.

Another embodiment of the present disclosure further provides an electronic apparatus which includes a memory and a processor. The memory is configured to store a computer program, and the processor is configured to execute the computer program to perform the method embodiments described above.

In the embodiments of the present application, the auxiliary transmission can be achieved without complicated cooperation between the access points located in the multiple access point set, thereby improving the access efficiency of the station and reducing the transmission delay of the downlink traffic.

DETAILED DESCRIPTION

The present application will be described hereinafter in detail with reference to the drawings and in conjunction with embodiments.

The terms "first", "second" and the like described herein are used to distinguish between similar objects and are not necessarily used to describe a particular order or sequence.

Figure 1:
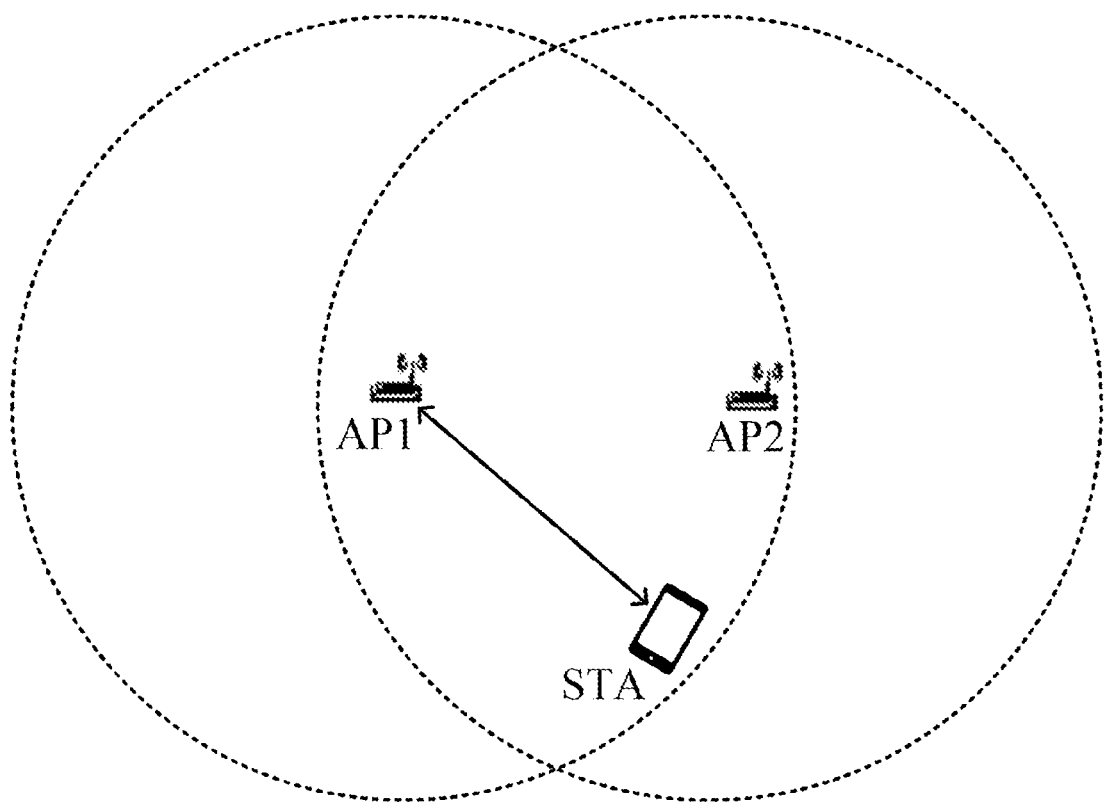
FIG. 1 is a schematic diagram of a basic service set in the related art.
Figure 2:
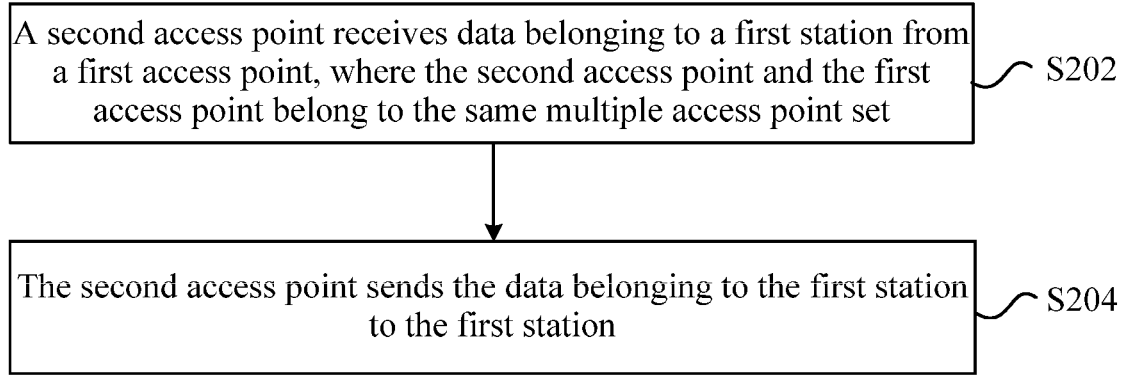
FIG. 2 is a flowchart of an auxiliary transmission method for multiple access points according to an embodiment of the present disclosure.

In an embodiment, an auxiliary transmission method for multiple access points is provided. FIG. 2 is a flowchart of an auxiliary transmission method for multiple access points according to an embodiment of the present disclosure. As shown in FIG. 2, the method includes steps S202 and S204.

In step S202, a second access point receives data belonging to a first station from a first access point, where the second access point and the first access point belong to the same multiple access point set.

In step S204, the second access point sends the data belonging to the first station to the first station.

In the above-mentioned embodiment, multiple access point sets constitute a multiple access point set. Each access point carries multiple access point set information in a radio frame sent by the each access point itself.

In the above-mentioned embodiment, the first station is associated with the first access point, and the second access point may serve as an assistance access point to assist in transmitting the data belonging to the first station.

In the above-mentioned embodiment, before the second access point sends the data to the first station, the first access point sends data to the second access point, where the transmitted data is encrypted according to a key negotiated between the first access point and the first station, and the first access point transmits necessary parameters to the second access point, including a sequence number corresponding to the data, coordinated type and other parameters.

In the above-mentioned embodiment, after the data is received, the first station processes the load of the data according to the key negotiated with the first access point.

In step S204, when the second access point sends the data to the first station, the transmitter address of the sent data of the first station is set as the basic service set identifier (BSSID) of the second access point. The receiver address is set as the media access control (MAC) address of the first station. In addition, Address 3 is optionally set as the BSSID of the first access point.

In the above-mentioned embodiment, when the first station receives a radio frame whose receiver address is the MAC address of the first station itself but whose transmitter address is the BSSID of one access point in the multiple access point set, the first station identifies the radio frame as a radio frame of the basic service set (BSS) of the first station itself.

In the above-mentioned embodiment, the first station responds to the radio frame and sends an acknowledgement frame. In the sent acknowledgement frame, the receiver address is set as the MAC address of the second access point.

In the above-mentioned embodiment, after the second access point receives the acknowledgement frame sent from the station, the second access point reports a transmission state of the data to the first access point.

The technical solutions of the present disclosure in different scenarios will be described below in conjunction with embodiments.

Embodiment One

In the future smart home, multiple access point devices are deployed in the home, and these access point devices are connected to the Internet of Things (IoT) devices such as sensors, home appliances, and smart lights and also connected to entertainment or work devices such as smart phones, tablet computers, and notebooks. In this scenario, the multiple access point devices are connected to each other in a connection manner of a tree structure (they are connected along the north-south direction and disconnected along the east-west direction) or a mesh structure (they are connected along both the north-south direction and the east-west direction).

Figure 3:
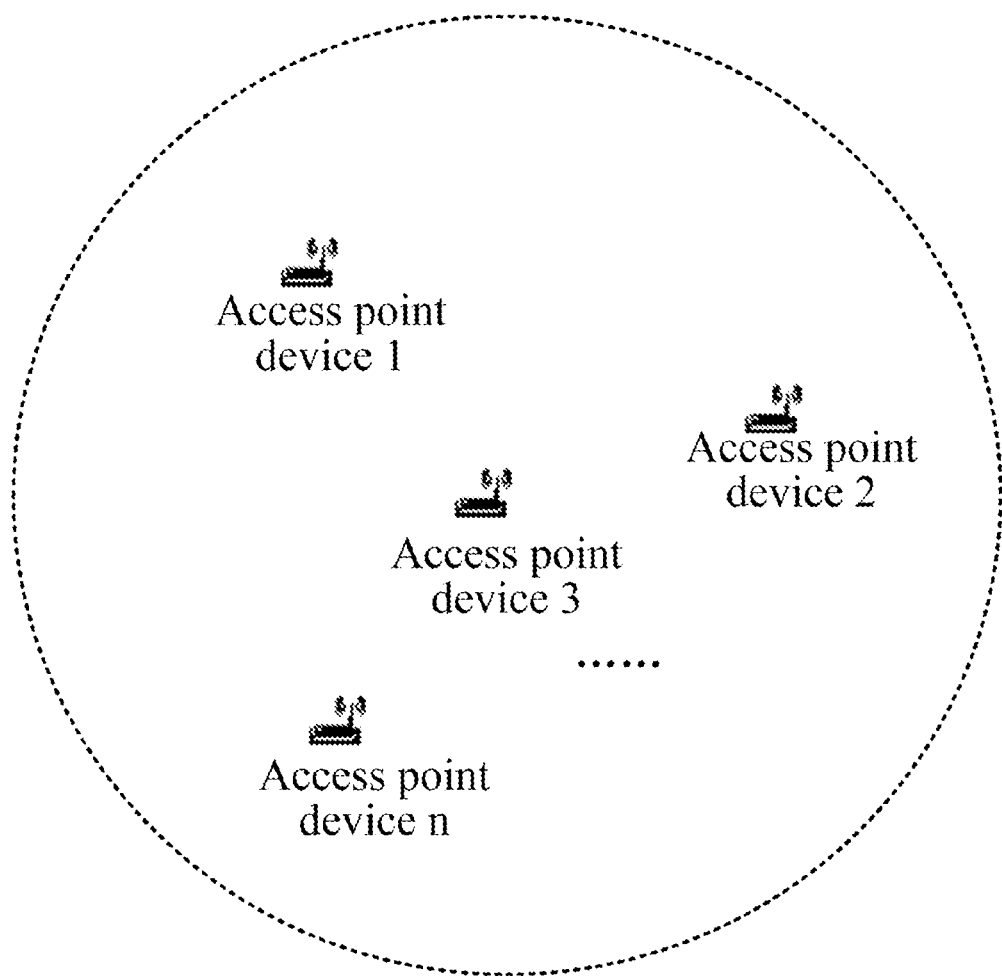
FIG. 3 is a schematic diagram of a multiple access point set according to an embodiment of the present disclosure.

In this embodiment, multiple access point devices are deployed in a home, as shown in FIG. 3. In this embodiment, the access point devices refer to devices having an access point function, and these access point devices are respectively access point device 1, access point device 2, access point device 3, . . . , and access point device n. These access point devices constitute a multiple access point set. Each access point device may obtain information of other access point devices in the set, such as the identifier, operating channel, and data relay mode of access point device. The data relay mode refers to the way data is relayed between two access points, such as Internet protocol (IP) packet relay, MAC service data unit (MSDU) relay, MAC protocol data unit (MPDU) relay, and the like. The identifier of each access point device may be a BSSID, a service set identifier (SSID), a MAC address of the each access point device, or the like.

The multiple access point devices notify the multiple access point set information in a beacon, probe response, association response, re-association response, fast initial link setup discovery (FILS) frame or other frames sent by the respective access point devices, where the notified information includes an identifier, operating channel, MAC capability, and physical layer (PHY) capability of each access point.

There is a case where a station (such as a mobile phone, laptop, iPad, and the like) is accessed to an access point device, which will be described by using an example where a station is accessed to the access point device 1. In an embodiment, when the station and the access point device 1 perform association authentication, the station indicates in a radio frame sent by the station itself a capability of the multiple access point auxiliary transmission supported by the station, and the simplest indication including supporting or not supporting. The station may also indicate requirements of the station for multiple access point auxiliary transmission, including a throughput requirement, a delay requirement, and the like, and the requirements are not limited to the requirements listed above. The requirements of the station for multiple access point auxiliary transmission may be indicated based on traffic, access categories, or station types.

When the station and the access point device 1 complete the necessary process of data transmission such as association authentication, the station and the access point device 1 perform data transmission. The access point device 1 or other network elements monitors the network condition, including the link condition between the respective access point devices and the station, and the load condition. The access point device 1 or other network elements, for example, find that the access point device 2 can provide better service (such as a higher rate, a lower delay and the like) for the station. The access point device 1 transfers the data of the station to the access point device 2. The access point device 2 sends the data to the station. The access point device 2 does not perform association authentication with the station prior to data transmission, and the station is still only associated with the access point device 1. The identifier of the station may be a MAC address of the station, an association identifier (AID), or the like.

The access point device 2 contends for a channel, and when the channel is contended for, sends data to the station, and the sent data frame is typically required to carry the following addresses: Address 1 (receiver address) and Address 2 (transmitter address). There may also be Address 3. When the access point device 2 sends a data frame to the station, the addresses of the radio frame are set as follows:

(1) The receiver address is set as the identifier of the station. The identifier of the station is the MAC address of the station.

(2) The transmitter address is set as the identifier of the access point device 2.

(3) Optionally, Address 3 is set as the identifier of the access point device 1.

When the station receives the data frame, if the station finds that the receiver address is the identifier of the station and the transmitter address is the identifier of one access point (that is, the identifier of the access point device 2) in the multiple access point set information, then the station considers the data frame to be a data frame sent to itself, as shown in FIG. 3. The station decrypts the load of the data frame according to key information negotiated with the access point device 1.

The station sends an acknowledgement frame (including an Ack frame and a block Ack frame) to the access point device 2 according to the receiving of the data frame, and the addresses of the sent acknowledgement frame are set as follows:

(1) If the acknowledgement frame is an Ark frame, the receiver address is set as the identifier of the access point device 2.

(2) If the acknowledgement frame is a block Ark frame, the receiver address is set as the identifier of the access point device 2, and the transmitter address is set as the identifier of the station.

After the access point device 2 receives acknowledgement information from the station, optionally, the access point device 2 sends the receiving state of the station to the access point device 1.

The access point device 2 retransmits a data frame that needs to be retransmitted to the station according to the receiving state of the station.

Embodiment Two

Figure 4:
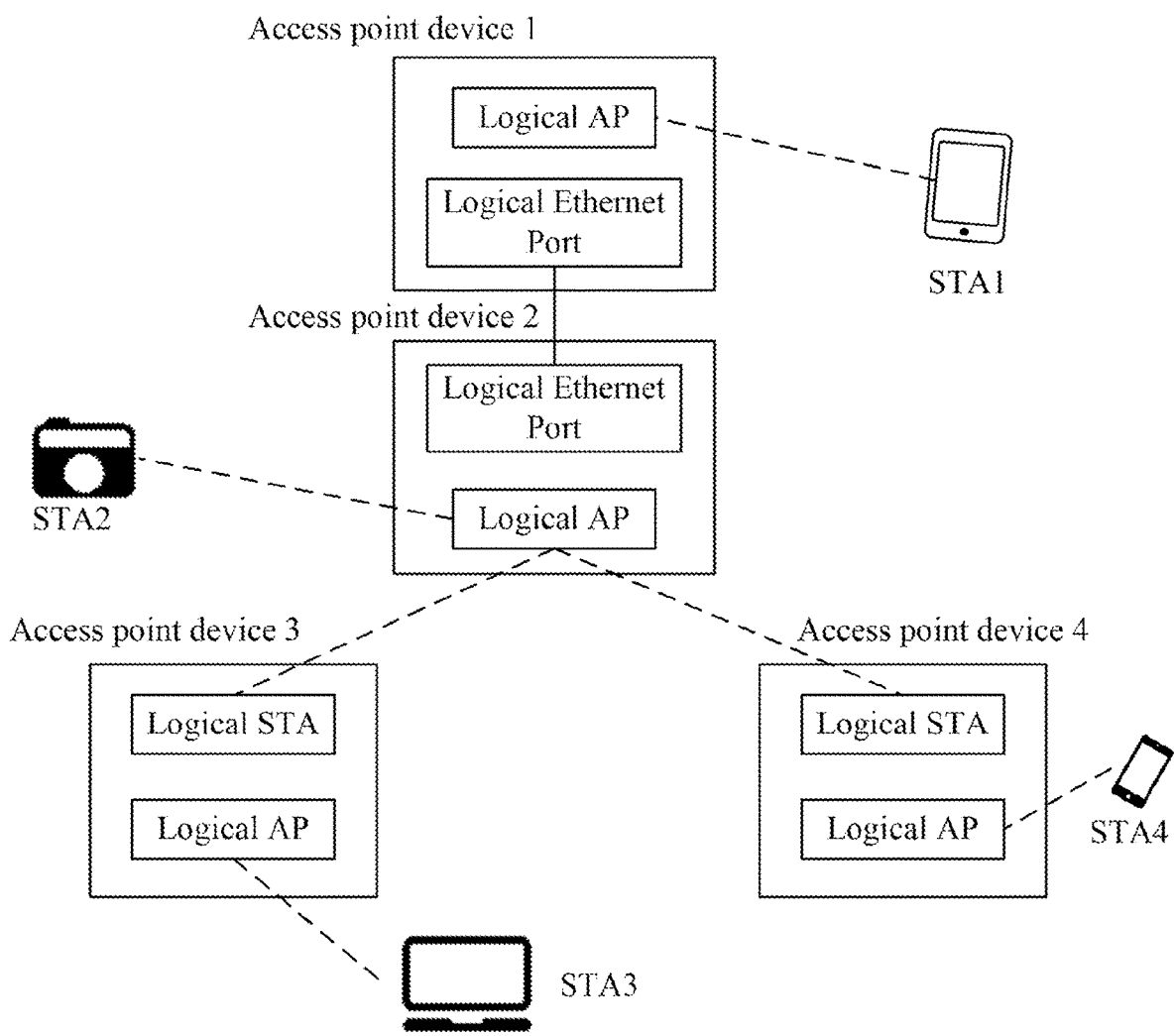
FIG. 4 is a schematic diagram of a tree-structured multiple access point set according to an embodiment of the present disclosure.

In an enterprise network, multiple access point devices are deployed in the enterprise, and these access point devices form a network to provide network connection services for employees and devices of the enterprise. As shown in FIG. 4, the architecture for deployment of multiple access point devices is described, which is a tree architecture. In addition, the architecture formed by multiple access point devices may also be a mesh architecture. In FIG. 4, the multiple access point devices refer to devices having an access point function, and the multiple access point devices may further be provided with modules having other functions.

FIG. 4 describes the architecture having four access point devices. The access point device 1 and the access point device 2 have an access point function and an Ethernet port function. The access point device 1 and the access point device 2 are connected via an Ethernet port. The STA1 is connected to the access point function of the access point device 1. The STA2 is connected to the access point function of the access point device 2. The access point device 3 and the access point device 4 have an STA function and an access point function. The access point device 3 and the access point device 4 are equivalent to STAs for the access point device 2. The STA3 and STA4 are associated with the access point device 3 and the access point device 4, respectively. The access point devices may also be connected in other manners, for example, via power lines, coaxial cables, and the like.

The access point device 1, the access point device 2, the access point device 3, and the access point device 4 constitute a multiple access point set. Each access point device may obtain information of other access point devices in the multiple access point set, including an identifier, operating channel, MAC capability, and PHY capability of an access point device. The identifier of each access point device may be a BSSID, an SSID, a MAC address of the each access point device, or the like.

The access point device 3 has a multiple BSSID set capability. In addition to the above-mentioned access point information, other access point devices may also obtain multiple BSSID set information of the access point device 3. In an embodiment, the access point device 3 uses one BSSID in the multiple BSSID set as the identifier of the access point device 3.

The multiple access point devices broadcast the multiple access point set information in a beacon, probe response, association response, re-association response, FILS discovery frame or other frames sent by the respective access point devices, and the broadcasted information includes an identifier, operating channel, MAC capability, and PHY capability of each access point.

When the STA2 and the access point device 2 complete the necessary processes prior to data transmission, the STA2 sends a radio frame to the access point device 2 to request the multiple access point set information of the access point device 2. The access point device 2 sends a response to the STA2, and the response includes the multiple access point set information.

The STA2 sends a traffic stream (TS) establishment request to the access point device 2, and the sent traffic stream establishment request needs to include requirement information and capability information for multiple access point transmission. The requirement information includes one of a minimum rate requirement, a minimum bandwidth requirement, a minimum delay requirement or an average delay requirement. The capability information includes one of a capability indication of multiple access point transmission or a capability indication of a multiple access point set. The capability indication of multiple access point transmission refers to whether a station supports multiple access point auxiliary transmission. The capability indication of the multiple access point set refers to whether to support the identification of the multiple access point set.

The STA2 reports link quality information between the STA2 and the access point device 2 to the access point device 2, and optionally, the STA2 reports to the access point device 2 link quality information between other access points and the STA2 in the multiple access point set information broadcasted by the access point device 2.

The access point device 1, the access point device 3, and the access point device 4 in the multiple access point set may also report to the access point device 2 link quality information between themselves and an STA associated with the access point device 2, respectively.

The access point device 2 decides to let the access point device 3 perform assistance transmission according to the link condition between the access point 2 and the STA2, the load condition of the entire BSS, the link condition between other access point devices and the STA2 or the load condition, or interference condition or other information of other access point devices.

The access point device 2 transmits the data of the STA2 to the access point device 3 to prevent multiple access point devices from establishing key negotiations with the STA respectively. The data of the STA2 transmitted by the access point device 2 to the access point device 3 is encrypted by using a key negotiated between the access point device 2 and the STA2, that is, at least the MPDU encryption process is completed, and optionally, the access point device 2 further transmits the sequence number corresponding to the data that has been subjected to the MPDU encryption process to the access point device 3.

The access point device 3 contends for the channel to transmit the data of the STA2. The access point device 3 transmits the data to the STA2, and the sent data frame carries the following addresses: Address 1 (receiver address), Address 2 (transmitter address), and optionally Address 3. When the access point device 2 sends a data frame to the station, the addresses of the radio frame are set as follows:

(1) The receiver address is set as the identifier of the station.

(2) The transmitter address is set as the identifier of the access point device 3.

(3) Optionally, Address 3 is set as the identifier of the access point device 2.

The station sends an acknowledgement frame (including an Ack frame and a block Ack frame) to the access point device 2 according to the receiving of the data frame, and the addresses of the sent acknowledgement frame are set as follows:

(1) If the acknowledgement frame is an Ark frame, the receiver address is set as the identifier of the access point device 3.

(2) If the acknowledgement frame is a block Ark frame, the receiver address is set as the identifier of the access point device 3, and the transmitter address is set as the identifier of the station.

After the access point device 3 receives acknowledgement information from the station, optionally, the access point device 3 sends the data receiving state of the station to the access point device 2.

Embodiment Three

In a smart building, multiple access point devices are deployed in the building, and these access point devices provide network connection services for smart meters, water meters, video monitoring equipment, sensors, home appliances and home entertainment equipment in the building.

The multiple access point devices are connected to each other in a connection manner of a tree structure (they are connected along the north-south direction and disconnected along the east-west direction) or a mesh structure (they are connected along both the north-south direction and the east-west direction).

Figure 5:
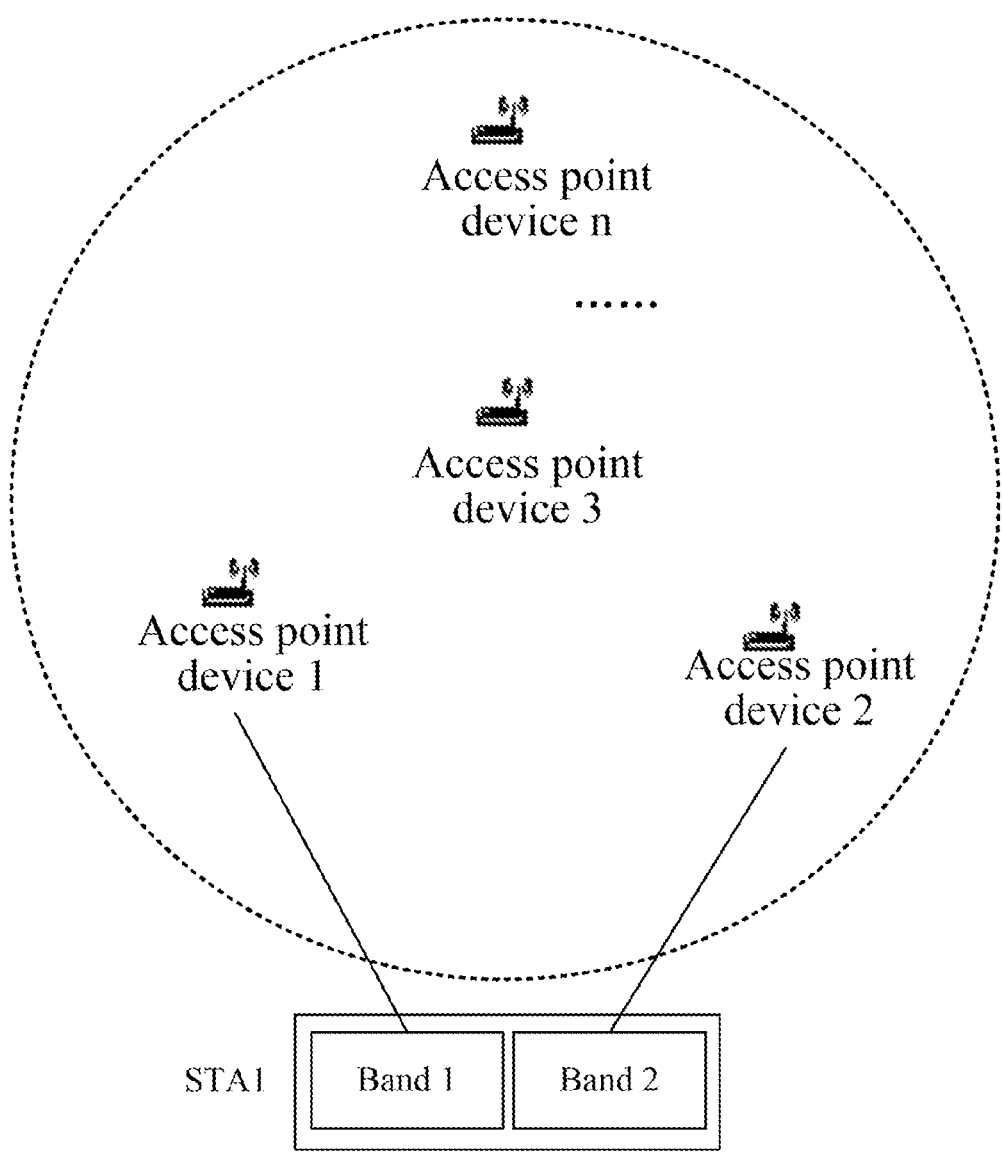
FIG. 5 is a schematic diagram of a station having multi-band capability and a multiple access point set according to an embodiment of the present disclosure.

The multiple access point devices are deployed in a home as shown in FIG. 5, and the access point devices refer to devices having an access point function and are respectively access point device 1, access point device 2, access point device 3, . . . , and access point device n.

These access point devices may operate in different bands. For example, the WLAN devices usually operate in three bands: 2.4 GHz, 5 GHz, and 6 GHz, where 2.4 GHz refers to 2.4 GHz to 2.5 GHz, 5 GHz refers to 5 GHz to 6 GHz, and 6 GHz refers to 6 GHz to 7 GHz. For example, in FIG. 5, the AP function of the access point device 1 operates in Band 1 which is assumed herein to be a bandwidth part in 5 GHz herein. The AP function of the access point device 2 operates in Band 2 which is assumed herein to be a part bandwidth in 6 GHz. The access point device 1 and the access point device 2 may have other AP functions operating in other bands.

The access point devices 1 to n constitute a multiple access point set. Each access point device may obtain information of other access point devices in the set, such as the identifier, operating channel, encryption information, and data transfer mode of other access point devices. If a certain access point device is also a multi-band device, other access point devices may obtain access point capability information of the certain access point device in all bands, including the identifier, operating channel, and capability indication of whether to support assistance data transmission of the certain access point device in each band.

The STA1 is a station having multi-band capability and operates in Band 1 and Band 2. The STA1 communicates with the access point device 1 and the access point device 2 in Band 1 and Band 2, respectively. The STA1 notifies the access point device 1 and the access point device 2 of the multi-band capability of the STA1 itself in Band 1 and Band 2, respectively, and the notified information includes the operating channel, bandwidth, primary channel, MAC address, and association access point identifier in each band.

The STA1 may report to the access point device 1 or the access point device 2 the requirement information and capability information for the multiple access point auxiliary transmission in the association process or the TS establishment process. The requirement information includes one of a minimum rate requirement, a minimum bandwidth requirement, a minimum delay requirement or an average delay requirement. The capability information includes one of a capability indication of multiple access point transmission, a capability indication of a multiple access point set or multiple access point auxiliary transmission indication capability. The capability indication of multiple access point transmission refers to whether a station supports multiple access point auxiliary transmission. The capability indication of the multiple access point set refers to whether to support the identification of the multiple access point set. The multi-band auxiliary transmission capability refers to whether the same TS can be transmitted in different bands.

The access point device 1 broadcasts the above-mentioned multiple access point set information in Band 1 through the sent beacon, probe response, association response, re-association response, and FILS discovery frame, or notifies the above-mentioned multiple access point set information in other frames. The notified information includes the identifier, operating channel, MAC capability, and PHY capability of each access point.

The STA1 communicates with the access point device 1 in Band 1, and the STA1 communicates with the access point device 2 in Band 2. The STA1 reports the link quality of Band 1 to the access point device 1 in Band 1, and optionally, the STA1 reports in Band 1 the link quality between the STA1 and other access points in the multiple access point set, for example, the STA1 reports the channel quality of the STA1 and the access point device 2 in Band 2.

The access point device 1 selects the access point device 2 to transmit the data of the STA1 of the STA1 and the access point device 1 in Band 1 according to the link condition between the access point device 1 and the STA1, the load condition of the entire BSS, the link condition between other access point devices and the STA1 or the load condition, or interference condition or other information of other access point devices.

The access point device 1, according to the multiple access point set information and the multi-band capability reported by the STA1, knows that the access point device 2 in the multiple access point set communicates with the STA1 through Band 2. The access point device 1 transmits the data of the STA1 to the access point device 2

The access point device 2 transmits the data of the STA1 transmitted from the access point device 1 to the STA1 in Band 2. The access point device 2 contends for a channel in Band 2, and when the channel is contended for, the access point device 2 sends the data to the STA1, and the sent data frame carries the following addresses: Address 1 (receiver address) and Address 2 (transmitter address) and may also carry Address 3. When the access point device 2 sends a data frame to the station, the addresses of the radio frame are set as follows:

(1) The receiver address is set as the identifier of the station. The identifier may be the MAC address used by the station in Band 1.

(2) The transmitter address is set as the identifier of the access point device 2. The identifier may be the MAC address used by the access point device in Band 2.

(3) Optionally, Address 3 is set as the identifier of the access point device 1. The identifier may be the MAC address used by the access point device 1 in Band 1.

Alternatively, the addresses of the radio frame are set as follows:

(1) The receiver address is set as the identifier of the station. The identifier may be the MAC address used by the station in Band 2.

(2) The transmitter address is set as the identifier of the access point device 2. The identifier may be the MAC address used by the access point device 2 in Band 2.

(3) Optionally, Address 3 is set as the identifier of the access point device 1. The identifier may be the MAC address used by the access point device 1 in Band 1.

The station sends an acknowledgement frame (including an Ack frame and a block Ack frame) to the access point device 2 according to the receiving of the data frame, and the addresses of the sent acknowledgement frame are set as follows:

(1) If the acknowledgement frame is an Ack frame, the receiver address (RA) is set as the identifier of the access point device 1 or the identifier of the access point device 2.

(2) If the acknowledgement frame is a block Ark frame, the RA is set as the identifier of the access point device 1 or the identifier of the access point device 2, and the transmitter address (TA) is set as the identifier of the station.

After the access point device 2 receives acknowledgement information from the station, optionally, the access point device 2 sends the data receiving state of the station to the access point device 1.

There is also a more complex application case in this application scenario. Since the STA1 and the access point device 2 may have already had traffic in Band 2, the access point device 2 needs to transmit in Band 2 the data of the STA1 that is originally transmitted in Band 1 and the data of the STA1 that has already been present in Band 2.

In an embodiment, the data of the STA1 transmitted from the access point device 1 is denoted as Data 1, and the data to be transmitted to the STA1 by the access point device 2 is denoted as DATA2. DATA1 and DATA2 are aggregated in the same A-MPDU, with DATA1 in A-MPDU subframe 1 and DATA2 in A-MPDU subframe 2. Each subframe includes a MAC header, and the MAC header carries the following addresses: Address 1 (receiver address), Address 2 (transmitter address), and optionally, Address 3.

The access point device 2 sets the addresses of the radio frame in the following manner.

(1) The receiver address in the A-MPDU subframe 1 is set as an identifier used by the STA1 in Band 1, and the identifier is the MAC address used by the STA1 in Band 1. The receiver address in the A-MPDU subframe 2 is set as an identifier used by the STA1 in Band 2, and the identifier is the MAC address used by the STA1 in Band 2.

(2) The transmitter address in the A-MPDU subframe 1 is set as an identifier used by the access point device 2 in Band 2, and the identifier is the MAC address used by the access point device 2 in Band 2. The transmitter address in the A-MPDU subframe 2 is set as an identifier used by the access point device 2 in Band 2, and the identifier is the MAC address used by the access point device 2 in Band 2.

Figure 6:
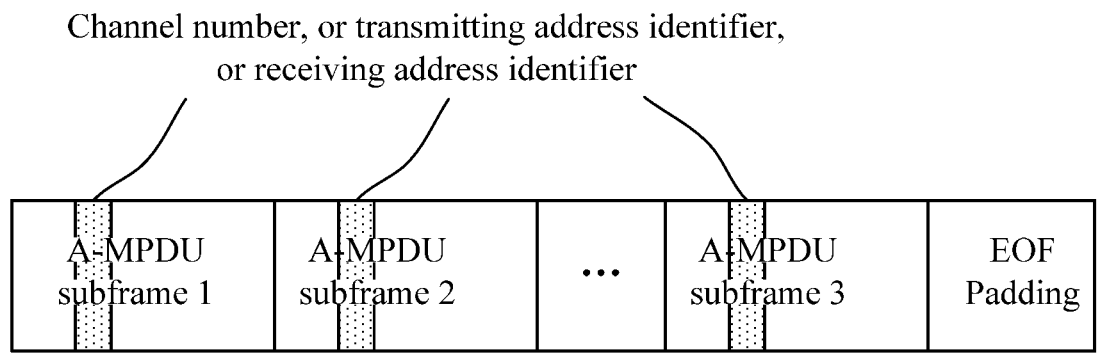
FIG. 6 is a schematic diagram of radio frame home information carried in an aggregated-medium access control protocol data unit (A-MPDU) according to an embodiment of the present disclosure.

In another embodiment, additional information may be added in the MAC header to indicate the current subframe home, and the additional indication to be added includes one of a channel number, an identifier of a transmitting device or an identifier of a receiving device. The transmission format is shown in FIG. 6. The additional information indication added in the MAC header may be added in a high throughput control (HT Control) field.

From the description of the preceding embodiments, the methods in the preceding embodiments may be implemented by means of software plus a general-purpose hardware platform or may of course be implemented by hardware. The solution of the present application may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method in the embodiments of the present application.

In an embodiment, an auxiliary transmission device for multiple access points is further provided. The device is configured to implement the above-mentioned embodiments and implementations. What has been described will not be repeated. As used below, the term "module" or "unit" may be software, hardware or a combination thereof capable of implementing predetermined functions. The apparatus described below in this embodiment is implemented by software, but an implementation by hardware or by a combination of software and hardware is also possible and conceived.

Figure 7:
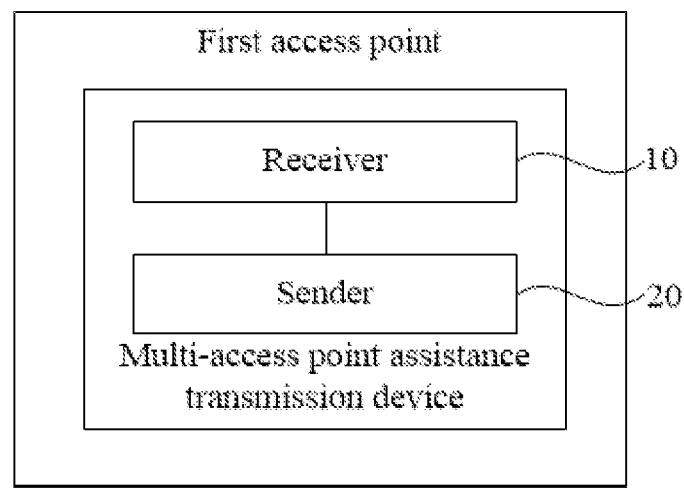
FIG. 7 is a structural diagram of an auxiliary transmission apparatus for multiple access points according to an embodiment of the present disclosure.

FIG. 7 is a structural diagram of an auxiliary transmission apparatus for multiple access points according to an embodiment of the present disclosure. As shown in FIG. 7, the apparatus is located in a second access point and includes a receiver 10 and a sender 20.

The receiver 10 is configured to receive data belonging to a first station from a first access point, where the second access point and the first access point belong to the same multiple access point set.

The sender 20 is configured to send the data belonging to the first station to the first station.

In the above-mentioned embodiment, multiple access point sets constitute a multiple access point set, and the multiple access point sets include the first access point and the second access point.

In the above-mentioned embodiment, the data belonging to the first station and received by the receiver 10 is encrypted according to a key negotiated between the first access point and the first station.

The data belonging to the first station and received by the receiver 10 carries a sequence number corresponding to the data and/or a coordinated mode of the data.

In the above-mentioned embodiment, a data frame of the data belonging to the first station and sent by the sender 20 carries a transmitter address and a receiver address, where the transmitter address is set as the BSSID of the second access point, and the receiver address is set as the MAC address of the first station. The BSSID of the first access point is further carried in the data frame.

In the above-mentioned embodiment, the receiving module 10 is further configured to receive an acknowledgement frame sent by the first station according to the receiving of the data frame to the second access point, where a receiver address in the acknowledgement frame is set as the identifier of the second access point.

The acknowledgement frame may be an Ack frame or a block Ack frame, where in the Ack frame, the receiver address is set as the address of the second access point, and in the block Ack frame, the receiver address is set as the address of the second access point and a transmitter address is set as the MAC address of the first station.

In the above-mentioned embodiment, the sender 20 is further configured to report, after the acknowledgement frame sent by the first station is received, a transmission state of the data of the station to the first access point.

The various modules described above may be implemented by software or hardware. Implementation by hardware may, but may not necessarily, be performed in the following manner: the various modules described above are located in a same processor or located in their respective processors in any combination form.

The embodiments of the present disclosure further provide a non-transitory storage medium. The non-transitory storage medium is configured to store a computer program, where the computer program is configured to, when executed, perform the steps in the method embodiments described above.

In an embodiment, in this embodiment, the non-transitory storage medium may include, but is not limited to, a universal serial bus (USB) flash disk, a ROM, a RAM, a mobile hard disk, a magnetic disk, an optical disk or another medium capable of storing computer programs.

The embodiments of the present disclosure further provide an electronic apparatus which includes a memory and a processor. The memory is configured to store a computer program, and the processor is configured to execute the computer program to perform the steps in the method embodiments described above.

Each of the modules or steps described in the present application may be implemented by a universal computing device. The modules or steps may be concentrated on a single computing device or distributed on a network composed of multiple computing devices. Optionally, the modules or steps may be implemented by program codes executable by the computing device so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. An auxiliary transmission method for multiple access points, comprising:
   receiving, by a second access point, data belonging to a first station from a first access point, wherein the second access point and the first access point belong to a same multiple access point set;
   carrying, by the second access point in a data frame for sending the data belonging to the first station, a channel number, a transmitter address and a receiver address, wherein the transmitter address is set as an identifier of the second access point, the receiver address is set as an identifier of the first station, and the channel number, the transmitter address and the receiver address are added into the data frame through a high throughput control (HT Control) field; and
   sending, by the second access point, the data belonging to the first station to the first station.

2. The method of claim 1, before receiving, by the second access point, the data belonging to the first station from the first access point, further comprising:
   constituting, by a plurality of access points, a multiple access point set, wherein the plurality of access points comprises the first access point and the second access point; and
   after constituting, by the plurality of access points, the multiple access point set, notifying, by each access point in the multiple access point set, multiple access point set information in a radio frame sent by the each access point in the multiple access point set;
   wherein the multiple access point set information comprises one of: an identifier of each access point, an operating channel of each access point, a media access control (MAC) capability of each access point or a physical layer (PHY) capability of each access point.

3. The method of claim 1, before receiving, by the second access point, the data belonging to the first station from the first access point, further comprising:
   associating, by the first access point, with the first station.

4. The method of claim 3, further comprising: in a case where the first access point is associated with the first station, indicating, by the first station, in a radio frame sent to the first access point, capability of auxiliary transmission for multiple access points supported by the first station.

5. The method of claim 1, before receiving, by the second access point, the data belonging to the first station from the first access point, further comprising:
   selecting, by the first access point, the second access point to transmit the data belonging to the first station.

6. The method of claim 1, before receiving, by the second access point, the data belonging to the first station from the first access point, further comprising:
   sending, by the first access point, the data belonging to the first station to the second access point, wherein the data belonging to the first station is encrypted according to a key negotiated between the first access point and the first station.

7. The method of claim 1, wherein the data belonging to the first station and sent from the first access point to the second access point carries at least one of a sequence number corresponding to the data or a coordinated mode of the data.

8. The method of claim 1, further comprising: carrying an identifier of the first access point in the data frame for sending the data belonging to the first station.

9. The method of claim 1, further comprising:
   identifying, by the first station, according to the receiver address in the data frame as the identifier of the first station and the transmitter address as an identifier of an access point in the multiple access point set, the data frame as a data frame sent to the first station.

10. The method of claim 9, further comprising:
    decrypting, by the first station, a load of the data frame according to key information negotiated with the first access point.

11. The method of claim 10, after receiving, by the first station, the data frame, further comprising:
    sending, by the first station, an acknowledgement frame to the second access point according to receiving of the data frame, wherein a receiver address in the acknowledgement frame is set as the identifier of the second access point.

12. An auxiliary transmission apparatus for multiple access points, located in a second access point, comprising:
    a receiver, which is configured to receive data belonging to a first station from a first access point, wherein the second access point and the first access point belong to a same multiple access point set; and
    a sender, which is configured to send the data belonging to the first station to the first station;
    wherein a data frame of the data belonging to the first station and sent by a sending module carries a channel number, a transmitter address and a receiver address, wherein the transmitter address is set as an identifier of the second access point, the receiver address is set as an identifier of the first station, and the channel number, the transmitter address and the receiver address are added into the data frame through a high throughput control (HT Control) field.

13. The apparatus of claim 12, wherein a plurality of access points constitute a multiple access point set, wherein the plurality of access points comprises the first access point and the second access point.

14. The apparatus of claim 12, wherein the data belonging to the first station and received by the receiver is encrypted according to a key negotiated between the first access point and the first station.

15. The apparatus of claim 12, wherein the data belonging to the first station and received by the receiver carries at least one of a sequence number corresponding to the data or a coordinated mode of the data.

16. The apparatus of claim 12, wherein the data frame further carries an identifier of the first access point.

17. The apparatus of claim 12, wherein
the receiver is further configured to receive an acknowledgement frame sent by the first station according to receiving of the data frame to the second access point, wherein a receiver address in the acknowledgement frame is set as the identifier of the second access point.

18. A non-transitory storage medium, storing a computer program, and being applicable in a second terminal, wherein the computer program is configured to, when executed by one or more processors in the second terminal, cause the second terminal to perform:
receiving data belonging to a first station from a first access point, wherein the second access point and the first access point belong to a same multiple access point set;
carrying, by the second access point in a data frame for sending the data belonging to the first station, a channel number, a transmitter address and a receiver address, wherein the transmitter address is set as an identifier of the second access point, the receiver address is set as an identifier of the first station, and the channel number, the transmitter address and the receiver address are added into the data frame through a high throughput control (HT Control) field; and
sending the data belonging to the first station to the first station.

* * * * *